US008825692B1

(12) United States Patent
Telnov

(10) Patent No.: US 8,825,692 B1
(45) Date of Patent: Sep. 2, 2014

(54) USER-SPECIFIED LOCALIZATION OF TEXT FOR PROGRAMS

(75) Inventor: Andrey Telnov, Tula (RU)

(73) Assignee: Developer Express Inc., Las Vegas, NV (US)

( * ) Notice: Subject to any disclaimer, the term of this patent is extended or adjusted under 35 U.S.C. 154(b) by 0 days.

(21) Appl. No.: 13/490,407

(22) Filed: Jun. 6, 2012

(51) Int. Cl.
*G06F 7/00* (2006.01)

(52) U.S. Cl.
USPC .......................................................... 707/760

(58) Field of Classification Search
USPC .......................................................... 707/760
See application file for complete search history.

(56) References Cited

U.S. PATENT DOCUMENTS

2008/0189096 A1* 8/2008 Apte et al. ........................ 704/2

* cited by examiner

*Primary Examiner* — Truong Vo
(74) *Attorney, Agent, or Firm* — Pillsbury Winthrop Shaw Pittman LLP

(57) ABSTRACT

The techniques described herein include a mechanism by which users (such as software developers) can modify runtime libraries in a local workspace to display personalized translations of text of spoken languages in their programs via a browser interface. A server provides translation libraries to users with extracted text strings that can be used with one or more runtime libraries. Users can then customize the text strings in the translation libraries locally according to their specific needs, and those customized text strings can be sent to the server, merged with the original translation libraries, and then compiled into custom translation libraries, which are digitally encrypted and sent back to the users as an automated process that avoids many problems of conventional approaches.

28 Claims, 4 Drawing Sheets

Process 200

USER-SPECIFIED LOCALIZATION OF TEXT FOR PROGRAMS

FIELD OF THE INVENTION

The present invention relates generally to computer software programs, and more particularly to providing translations of text found programs into one or more different spoken languages.

BACKGROUND OF THE INVENTION

Translating programs into one or more different spoken languages (e.g., French or German) from the language of the original program has been a standard process for many years, particularly for software programs and systems that are sold overseas. This process is referred to as "localizing" a program for the desired language. There are several conventional ways for localized text to be provided in a computer program.

One conventional way is to pre-translate text files of the original program into the target language and compile them into a specialized library that can then be called by a program at execution (runtime) of the computer program. These specialized libraries are referred to as "translated text libraries." This process can be performed, for example, manually by a runtime library vendor. Generally, this process is generally performed separately for each particular format and version of the computer program. A second conventional way is to alter the original program itself with translated text and recompile it to display the text strings in the particular target language. This process requires a substantial effort on part of the software developer.

A runtime library is a program library used by a compiler to implement functions built into a programming language during runtime. When the source code of a computer program is compiled (e.g., translated) into a computer-readable language, it would cause an extreme enlargement of program code if each command in the program and every call to a built-in function required generating a complete program in the target language every time. Instead of doing this, the compiler uses auxiliary functions in runtime libraries. This often includes functions for input and output, or memory management, as examples. Vendors of runtime libraries for programs have incorporated features into those libraries that enable the automatic detection of translated text libraries as well as the display of the translated strings of text within a program. Along with this effort, there have been efforts to standardize the translations of normal text that appear on buttons and in menus.

Despite this standardization, however, there are still requirements to have more personalized translations of standard text translations. There is generally more than one desired translation of a certain text into the target language. Different users, businesses, and fields of interest will therefore have a desire to customize certain translations. For instance, a word used in an engineering context may carry a different meaning than the same word when used by a doctor. Although the majority of the standard translations may suffice, there will almost always be some need for user-specific customization of text translations. User-specific localization of translated text is used in cases where a standard translation fails to capture the appropriate meaning in a particular context.

Translations of software programs are generally created and maintained by runtime library vendors for every major language. The translated text libraries are provided to customers with encryption as a compiled, digitally-signed library. For every customization, a new library must be created, compiled and digitally signed. For any user-specific customizations, software developers generally provide the custom translations to the runtime library vendors, and the vendors compile and digitally sign them, and then send them back to the developers to be tested with their software programs. In other cases, the runtime library vendors can provide both software programs and runtime libraries as a package. The software in those packages can be modified, compiled, signed, and sent back to the developers as a package. Often, runtime library vendors often cannot support customized versions of the software for future technical issues that may arise. As a result, it becomes burdensome for vendors, particularly if more than one target language is needed.

SUMMARY

The methods and apparatuses described herein are configured to provide a mechanism by which users of the system (such as software developers) can modify runtime libraries in a local workspace to display personalized translations of text in their programs without having to pass back-and-forth libraries and programs between the developers and runtime library vendors. A server provides translation libraries to users via a browser interface with extracted text strings that can be used with one or more runtime libraries. Users can then modify the text strings in the translation libraries locally according to their specific needs, and those modifications can be sent to the server, merged with the original translation libraries (referred to herein as base translation libraries), and then compiled, digitally encrypted, and sent back to the users as an automated process. Users can provide custom translations to the runtime library vendors as an automated process using a browser interface that avoids many problems of conventional approaches.

In one embodiment, users can receive base translation libraries from the runtime library vendor's server. Users can provide customized translations as needed via a browser interface provided by the server. The customized translations are sent to the server over a network, merged with the corresponding base translation library at the server, compiled into a custom translation library, which is then digitally encrypted and provided back to the user. The user can then download the customized library and use it with their programs or edit further as needed. In another embodiment, the base translation library can reside at the server and be made accessible to the programs running locally at the user's workspace. The programs can be used to locally edit text strings contained in the base translation library without using a browser interface. Each of the local edits can then by uploaded to the server as customized translations, which are merged with the corresponding base translation library, compiled into a custom translation library, and digitally signed with a private key. The signed custom translation library can then be sent back to the user for use in programs or for further editing as needed.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, in which.

DETAILED DESCRIPTION

For the purposes of explanation, numerous specific details are set forth throughout this description in order to provide a thorough understanding of the invention. It will be appreciated, however, by persons skilled in the art that the embodiments described herein may be practiced without some of these specific details. In other instances, well-known structures and devices are shown in block diagram form to avoid obscuring the underlying principles of the various embodiments.

Methods and apparatuses described herein are configured to provide a mechanism by which users (such as software developers) can modify runtime libraries in a local workspace to display personalized translations of text in their programs without passing libraries and programs back-and-forth between the users and runtime library vendors. In at least certain embodiments, a server provides translation libraries to users via an Internet browser interface with extracted text strings that can be used by one or more runtime libraries. The developers can then modify the text strings in the translation libraries locally according to their specific needs, and those modifications can be sent back to the server, merged with the original translation libraries (referred to herein as base translation libraries), and then compiled, digitally signed, and sent back to the developers as an automated process. The software developers no longer need to provide the custom translations to the runtime library vendors to be compiled and digitally signed; nor do they need to send their completed software programs to the vendors to provide the translations directly into the programs.

In one embodiment, users can receive base translation libraries from a server and can provide customized translations as needed via a browser interface. The customized translations are sent to the server over a network, merged with the corresponding base translation library at the server, compiled into a customized translation library, which is then digitally encrypted and provided back to the user. The user can download the customized library and edit further as needed.

Figure 1:
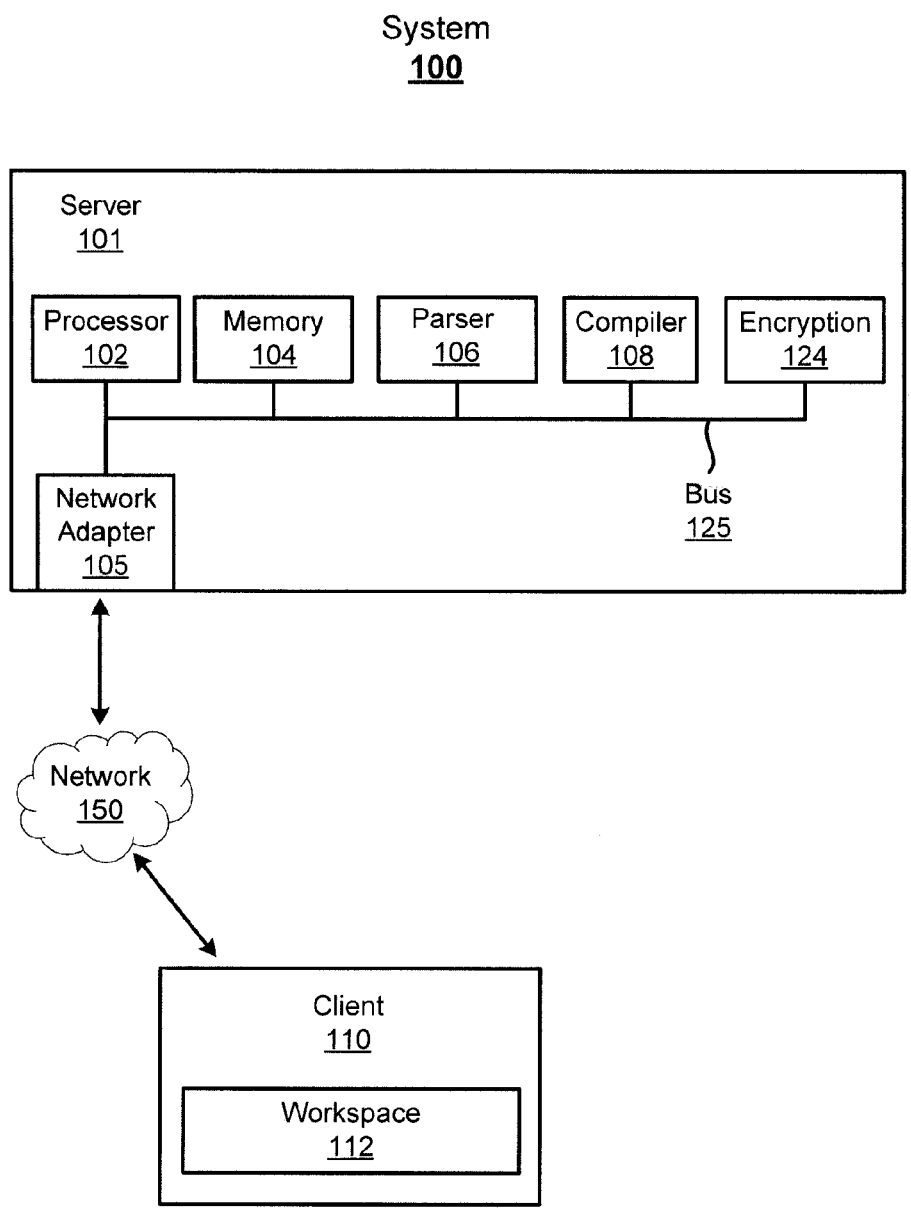
FIG. 1 depicts an example functional block diagram of an embodiment of a system for localizing computer programs.

FIG. 1 depicts an example functional block diagram of an embodiment of a system for localizing computer programs. In the illustrated embodiment, a program is being implemented by a user in a local workspace 112 of client 110. There is a server 101 coupled with the client 110 over a network 150 that communicates with client 110 according to the client-server model as is well known in the art. Server 101 also includes a processor 102, a memory 104, a parser component 106, a compiler 108, an encryption unit 124, and a network adapter 105 to receive data transmitted over the network. These components are all coupled over an interconnect bus 125 in the non-limiting embodiment shown. Network 150 can be implemented as any network capable of transmitting data including a wired or wireless network, Internet Protocol, Ethernet, link layer, token ring, or ATM, as examples. In addition, network 150 can be a local area network or wide-area network.

In at least certain embodiments, users may need to display personalized translated text in their programs running on client 110. Server 101 is provided (e.g., by a runtime library vendor) and configured to merge, compile, and digitally encrypt translation libraries. The server also provides users with a browser interface to its services. A translation library consists of strings translated into a particular target language, such as French or German for example. The runtime library vendor generally will have previously extracted text strings used by its runtime libraries into base translation libraries for supported languages. The text strings can be uniquely indexed in some fashion (e.g., by numbers) so that the runtime library code can retrieve the individual text strings by index. For example, the runtime library code can retrieve a particular text string using the command: "get text string for index 1234." The text strings may or may not already have been translated into the desired language, or the translation may only be partial with some text strings still needing to be translated.

Figure 2:
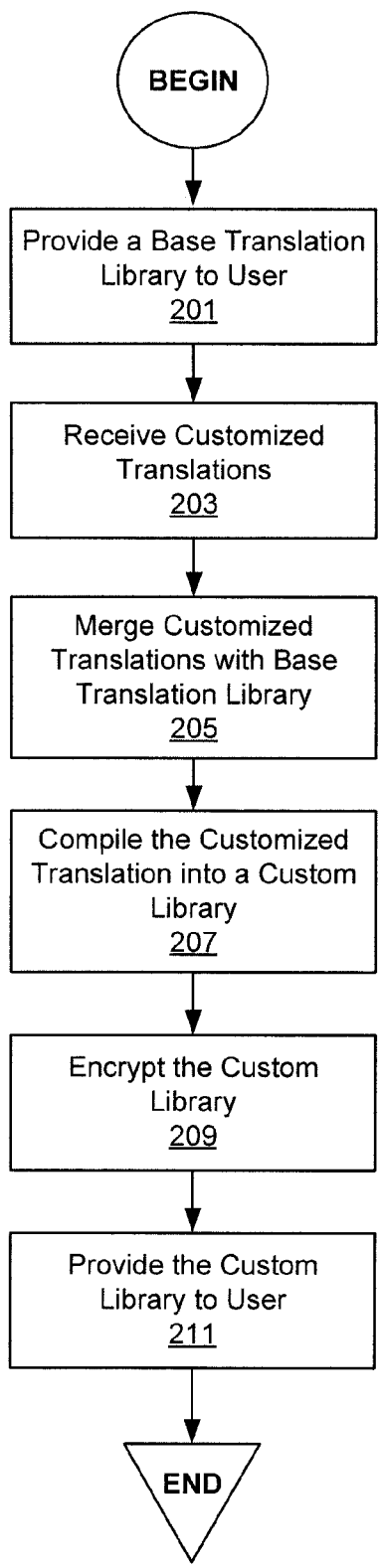
FIG. 2 depicts an example embodiment of a method for localizing computer programs.

The operation of system 100 will now be described with reference to process 200 of FIG. 2, which depicts an example embodiment of a method for localizing computer programs. Process 200 begins at operation 201 where a base translation library is provided to a client user 110 such as a software developer. Users can download the base translation library for the required language, platform, and version from the server 101.

Users can then provide customized translations of one or more text strings contained in the base translation library using a browser interface provided by the server 101 (operation 203). To do this, users can log into server 101. Upon login, users can be presented with a snapshot containing any translation work that has already been completed. An example text box in which users can view and edit translations of text strings is shown in Table 1. Users type in text that is to be translated into the text box.

TABLE 1

| Text Box | |
| --- | --- |
| Original Text | "The document does not contain any pages" |

The system then returns the base (or accepted) translation of this text string. Runtime library vendors will typically provide extracted text strings for the major languages in base translation libraries. In one embodiment, a "copy" button or link can be provided to copy the base translated string into the text box on the right hand side of the user interface as shown in Table 2.

TABLE 2

| Text Box | |
| --- | --- |
| Base Translation | "Ce document ne contient aucune page" |

Users can then edit this translation directly into the text box as shown in Table 3. Of course, users can also just type in a completely new string if they want as well.

TABLE 3

| Text Box | |
| --- | --- |
| User Custom Translation | "Le document ne contient pass des pages" |

Upon hitting a "save" button (or other key of equivalent functionality), the user-specified translation is updated in the system. A typical user interface according to the preferred embodiment would consist of 10, 20, or 50 repetitions of the above followed by the "save" button. Alternatively, each text string could have a "save" button provided alongside the text box.

Users also can accept the base translation for a particular text string. Using the browser interface, users can view the current translated text strings for a given platform, language, and version. The interface allows users to filter the text strings to show the original non-translated strings, the translated strings, and the modified translated strings. Users can also search for particular strings in the browser interface.

The customized translations are then stored at the server as a set of changes associated with the user's account and provided as a current snapshot to users via the web browser. In one embodiment, this set of changes can be stored in memory 104. The custom translations can then be merged with the corresponding base translation library at the server 101 at operation 205. In one embodiment, this is performed using parser unit 106. The merged translated text stings are then compiled into a custom translation library at operation 207. In one embodiment, this is performed using compiler 108. The custom translation library is then encrypted (operation 209). As is well known in the art, encryption is the process of transforming information (referred to as plaintext) using an algorithm (called a cipher) to make it unreadable to anyone except those possessing a private key. The result of the process is encrypted information (in cryptography, referred to as ciphertext). The reverse process, i.e., to make the encrypted information readable again, is referred to as decryption (i.e., to make it unencrypted). In one embodiment, this encryption is performed in unit 124.

The encryption can be done by digitally signing the custom translation library with the private key known only to the runtime library vendor. As is well known in the art, a digital signature is a mathematical scheme for demonstrating the authenticity of a digital message or document. A valid digital signature gives a recipient reason to believe that the message was created by a known sender, and that it was not altered in transit. Digital signatures are commonly used for software distribution. The signed custom translation library is then provided back to the user at operation 209. This completes process 200 according to one illustrated embodiment.

Local Editing

Figure 3:
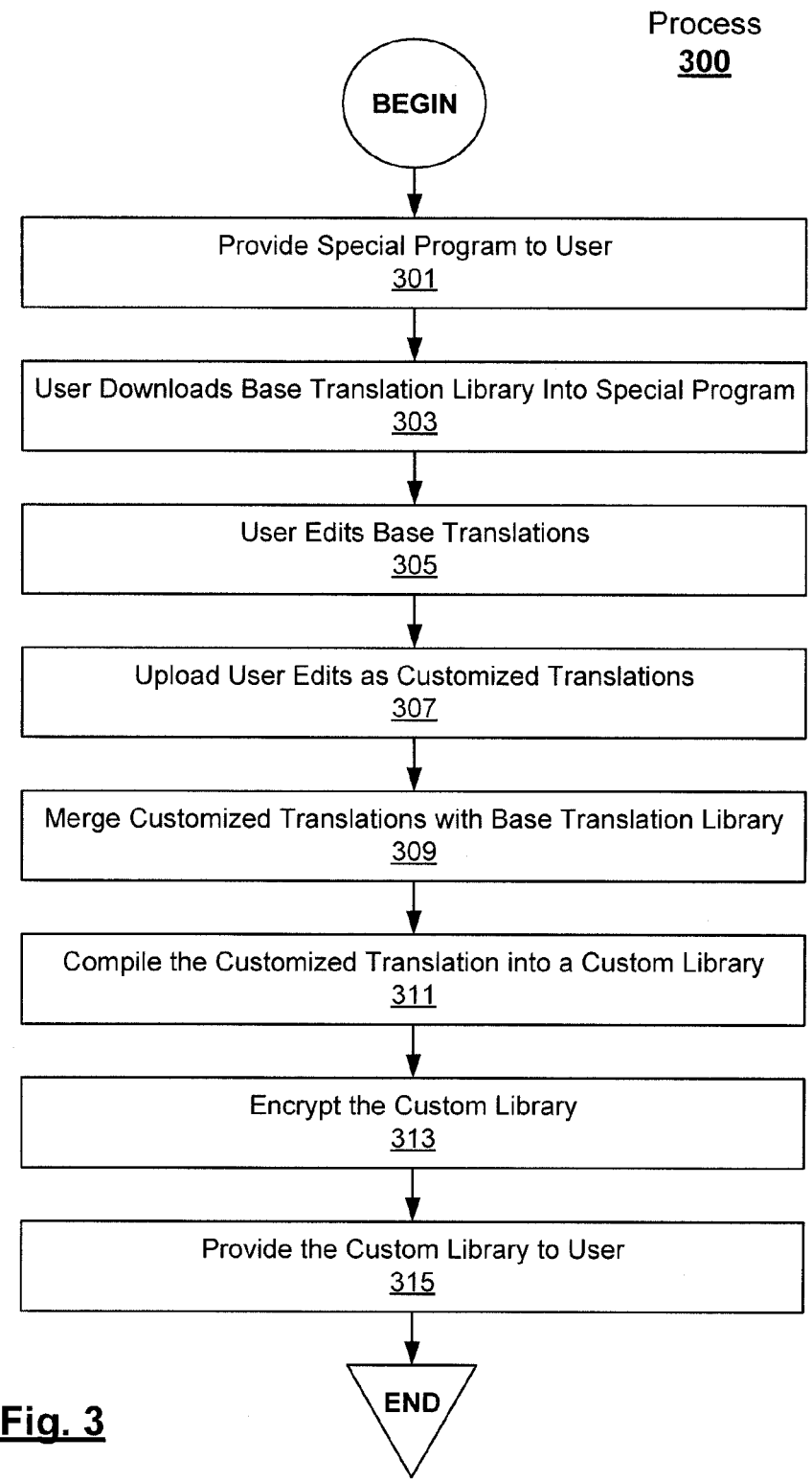
FIG. 3 depicts an example of a second embodiment of a method for localizing computer programs.

FIG. 3 depicts an example of an alternate method for localizing computer programs. In this embodiment, users can work on the translations locally if they prefer without using a browser interface. The library vendor provides a special program to users for locally editing the base translation library (operation 301). Users then download the base translation library into this special program (operation 303) and use the program to edit and make changes to the translated text strings (operation 305). Once the edits are complete, the program will upload the set of customized translations to the server (307), which then merges them with the base translation library (operation 309). The server further compiles the customized translations into a custom translation library (operation 311) and digitally signs the custom library (operation 313). As discussed above, this can be done with a private key. The signed custom library is then provided to the user at operation 315. This completes process 300 according to one illustrative embodiment.

Community Translations

Figure 4:
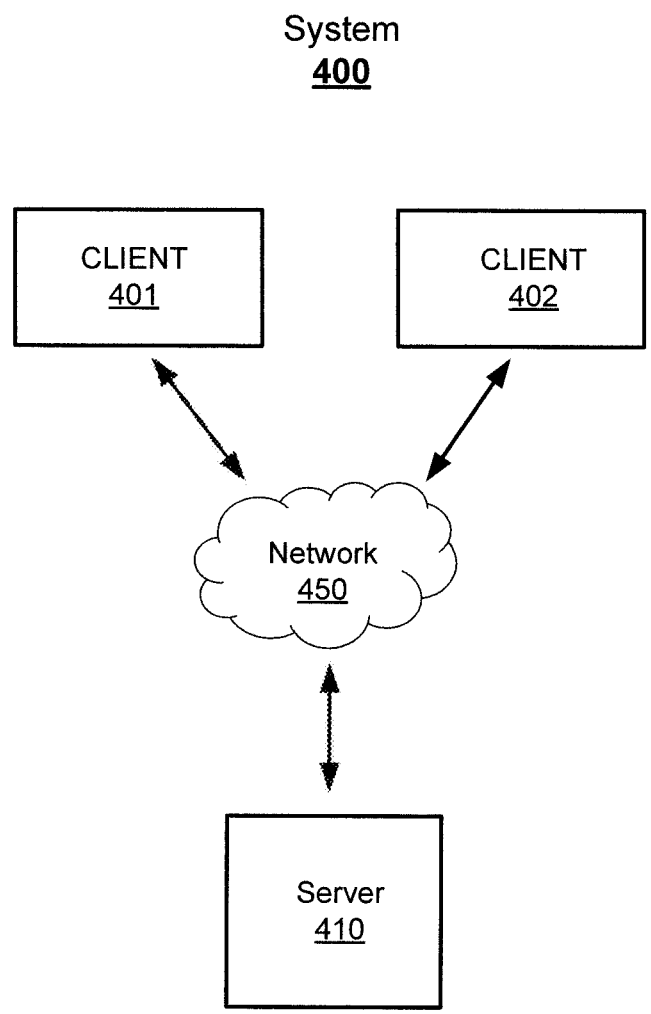
FIG. 4 depicts an example functional block diagram of an embodiment of a system for localizing computer programs.

The system can also be utilized to enable "crowd source" translations for a currently unsupported language. Here, developers needing translations of an unsupported language can mark their edits as "public" rather than "private." They can then refine their public text string translations as a community project, with the library vendor providing all developers with the same translation library. Using this process, the translations can be more correct as several users are editing and proofing them. In addition, if there are several developers on a particular project, the system can allow them to share their translations with other members of the project team, but not the general public. In this instance, the edits are "restricted" edits rather than purely "public" ones or "private" ones. Flags can be set to define the appropriate users for providing the edits. FIG. 4 depicts an example functional block diagram of an embodiment of a system for localizing computer programs with multiple contributing users. In this embodiment, system 400 includes a server 410 coupled with both clients 401 and 402 over network 450. As such, editing of translated text strings among multiple users can be facilitated.

Although the present invention has been particularly described with reference to the preferred embodiments thereof, it will be readily apparent to those of ordinary skill in the art that changes and modifications in the form and details of the disclosed embodiments can be made without departing from the spirit and scope of the invention. For instance, these techniques can be extended to editing pure software. If a particular customer wants a private change to a software program provided by a vendor, such as the turning on or off of a particular feature, then that can be accomplished using the same principles and mechanisms as discussed in this description. Thus, these techniques can also be used to recompile software code changes and provide them to users. Software source code can be broken down into classes or modules as well as methods within the classes or modules. Then users can use a similar browser interface to turn on and off each particular class, module, or method according to the teachings described herein.

In addition, the techniques described herein are not limited to any specific hardware circuitry or software, or combination thereof. It will be apparent to skilled artisans from this description that aspects of the invention may be embodied in software, hardware, firmware, or a combination of these. Operations may be embodied in computer-executable instructions which cause a general-purpose or special-purpose processor to perform the disclosed operations. In other embodiments, the operations can be implemented with custom hardware alone, or performed by specific hardware components that contain hardwired logic.

Further, embodiments disclosed herein may include various operations as set forth above, or fewer or more operations, or operations in an order different from the order described. An embodiment showing a singular component should not be considered limiting; rather, the invention is intended to encompass other embodiments including a plurality of components, and vice-versa, unless explicitly stated otherwise.

Accordingly, the scope of the invention should be judged in terms of the claims which follow as well as the legal equivalents thereof.

What is claimed is:

1. A method of localizing a computer program, comprising:
    receiving from a user via a browser interface a customized translation for one or more corresponding base text strings, wherein each customized translation comprises a text string that has been translated by the user into a translated spoken language from a different original spoken language, each of the base text strings being an original translation of the text string in the translated spoken language that is different than the corresponding customized translation, each of the one or more base text strings being contained in a base translation library;

merging each customized translation with the base translation library such that each customized translation replaces the corresponding base text string in the base translation library;

compiling the merged base translation library into a custom translation library; and digitally signing the custom translation library with a private encryption key so that it can be used with the computer program in a local workspace of the user without requiring user access to the private encryption key.

2. The method of claim 1, further comprising providing the custom translation library to the user.

3. The method of claim 1, wherein the signed custom translation library is used by one or more runtime libraries during execution of the computer program.

4. The method of claim 3, wherein the text strings are uniquely indexed within the translation libraries and the one or more runtime libraries retrieve the text strings using an index of the text strings.

5. The method of claim 4, wherein the indexed text strings can be searched.

6. The method of claim 1, wherein the base translation library further includes original text strings in the original spoken language corresponding to the base text strings.

7. The method of claim 6, wherein each base text string comprises a previous customized translation of the corresponding original text string.

8. The method of claim 6, further comprising filtering the text strings to display the original and customized translations of the text strings.

9. The method of claim 1, further comprising:
storing the customized translations as a set of changes to an account of the user; and
providing a current snapshot of the set of changes to the user via the browser interface.

10. The method of claim 1, wherein the base translation library is newly generated using customized translations received from one or more users when there is no existing base translation library.

11. The method of claim 1, further comprising allowing the user to elect to keep certain additional base text strings in the translated spoken language, such that the merged base translation library contains both customized translations of the one or more base text strings and the certain additional base text strings.

12. A method of localizing a computer program, comprising:
providing a special program to a user for editing one or more base text strings in a base translation library in a local workspace of the user without using a browser interface;
uploading each local edit from the user workspace as a customized translation of a corresponding one of the base text strings, wherein each customized translation comprises a text string that is in a translated spoken language different from an original spoken language, each of the base text strings being an original translation of the text string in the translated spoken language that is different than the corresponding customized translation;
merging each customized translation with the base translation library such that each customized translation replaces the corresponding base text string in the base translation library;
compiling the merged base translation library into a custom translation library; and
digitally signing the custom translation library with a private encryption key.

13. The method of claim 12, wherein the signed custom translation library is used with the computer program in a local workspace of the user without requiring user access to the private encryption key.

14. The method of claim 12, wherein the base translation library further includes original text strings in the original spoken language corresponding to the base text strings.

15. The method of claim 14, wherein each base text string comprises a previous customized translation of the corresponding original text string.

16. The method of claim 14, further comprising filtering the text strings to display the original and customized translations of the text strings.

17. The method of claim 12, wherein the text strings are uniquely indexed within the translation libraries and one or more runtime libraries retrieve the text strings using an index of the text strings.

18. The method of claim 17, wherein the indexed text strings can be searched.

19. The method of claim 12, wherein the base translation library is newly generated by the customized translations received from one or more users when there is no previously existing base translation library.

20. A server adapted to localize a computer program, comprising:
a processor;
an interconnect bus;
a browser interface to receive from a user a customized translation for one or more corresponding base text strings, wherein each customized translation comprises a text string that has been translated by the user into a translated spoken language from a different original spoken language, each of the base text strings being an original translation of the text string in the translated spoken language that is different than the corresponding customized translation, each of the one or more base text strings being contained in a base translation library;
a parser configured to merge each customized translation with the base translation library such that each customized translation replaces the corresponding base text string in the base translation library;
a compiler unit adapted to compile the merged base translation library into a custom translation library; and
an encryption unit to digitally sign the custom translation library with a private encryption key so that it can be used with the computer program in a local workspace of the user without requiring user access to the private encryption key.

21. The server of claim 20, wherein the custom translation library is provided to the user.

22. The server of claim 21, wherein the custom translation library is used by one or more runtime libraries during execution of the computer program.

23. The server of claim 21, wherein the base translation library further includes original text strings in the original spoken language corresponding to the base text strings.

24. The server of claim 23, wherein each base text string comprises a previous customized translation of the corresponding original text string.

25. The server of claim 23, wherein the text strings are uniquely indexed within the translation libraries and the one or more runtime libraries retrieve the text strings using an index of the text strings.

26. The server of claim 25, wherein the indexed text strings can be searched.

27. The server of claim 21, further comprising:
a memory to store the customized translations of the text strings as a set of changes to an account of the user; and
a snapshot engine to provide a current state of the set of changes to the user via the browser interface.

28. The server of claim 21, wherein the base translation library is newly generated by the customized translations received from one or more users when there is no previously existing base translation library.

\* \* \* \* \*